March 31, 1925.  1,531,312
E. SCHLUMBERGER
ELECTRODE
Filed Aug. 31, 1921
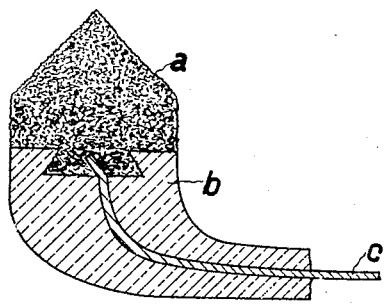
Inventor:
Ernst Schlumberger Patented Mar. 31, 1925.

1,531,312

UNITED STATES PATENT OFFICE.

ERNST SCHLUMBERGER, OF BERLIN, GERMANY, ASSIGNOR TO THE FIRM OF SCHOTT & GEN., OF JENA, GERMANY.

ELECTRODE.

Application filed August 31, 1921. Serial No. 497,412.

*To all whom it may concern:*

Be it known that I, ERNST SCHLUMBERGER, a citizen of the German Empire, and residing at Berlin, Germany, have invented a new and useful Electrode, of which the following is a specification.

Electrodes for electrolytic meters in which gases are electrolytically absorbed or liberated, are well known, which electrodes are made of a thin metal plate consisting of platinum or a similar substance and with which one or several cells are lined, the cells being so narrow that the electrolyte is prevented from entering by its surface tension; in another construction the electrodes consist of plaited work or a perforated plate of platinum or a similar substance by means of which a comparatively large cell is closed, the meshes or holes being in that case so narrow as to again prevent the electrolyte from entering. In any case the interior of the cells is filled with the respective gas, so that only the edges of the openings of the cells are always simultaneously in contact with the electrolyte and the gas. The uniformity of the effect of such electrodes is evidently due to the fact that the surface, by which the metal electrode is in contact with the electrolyte, is very small relatively to the surface by which the gas held fast by it is in contact with the electrolyte.

According to the invention the use of platinum or of a similar expensive substance is avoided by making the electrode of coke and entirely coating it (e. g. by means of galvanizing the same) with a metal capable of activating hydrogen (e. g. platinum, platinum-black, iridium or rhodium) in such a way that the metal coating follows the contours of the coke particles so as to form a continuous lining for the pores of the coke. With the electrolysis the pores of such an electrode are filled with the gas, whilst the electrolyte is prevented from entering owing to its surface tension. The new electrode has the further advantage that the gas liberated from the electrolyte and not kept back by its pores does not separate from it from time to time and in the shape of a larger bubble but that the gas, owing to the great number of surface irregularities of the coke particles, continually separates in the shape of small bubbles. If, therefore, the gas liberated from an electrode of the novel kind serves for measuring the quantity of electricity, which has traversed the respective meter, the indications of the latter do not progress by leaps but by degrees.

The annexed drawing shows in a section a constructional example of the invention on an enlarged scale. The coke-body of the electrode is denoted by $a$, the holder of the electrode, which consists of glass by $b$, the supply main by $c$.

I claim:

An electrode for electrolytic measuring instruments consisting of coke coated with a metal capable of activating hydrogen, said metal coating following the contour of the coke particles so as to form a continuous lining for the pores of the coke.

ERNST SCHLUMBERGER.